United States Patent

Ruth

[15] 3,643,541
[45] Feb. 22, 1972

[54] MUSIC TEACHING AID

[72] Inventor: Alver W. Ruth, 1125 Young Street, Honolulu, Hawaii 96814

[22] Filed: May 26, 1969

[21] Appl. No.: 827,769

[52] U.S. Cl. .................................................. 84/485, 84/470
[51] Int. Cl. .................................................. G09b 15/02
[58] Field of Search ................... 84/387, 388, 394, 464, 470, 84/471, 477, 485

[56] References Cited

UNITED STATES PATENTS 2,473,199  6/1949  Garcia .................................... 84/464
2,791,147  5/1957  Meadows ................................ 84/470

*Primary Examiner*—Richard B. Wilkinson
*Assistant Examiner*—Lawrence R. Franklin
*Attorney*—Frank P. Cyr

[57] ABSTRACT

An educational device for teaching a student chromatic notes and fingerings of horn instruments including a panel having note and scale representations, finger piston valves, and indicator and electrical circuit including jacks corresponding to the notes on the scale whereby placing the indicator in a jack and fingering of the piston valves causes the indicator to give a signal that the proper fingering corresponding to the selected note has occurred.

4 Claims, 7 Drawing Figures

INVENTOR
ALVER W. RUTH

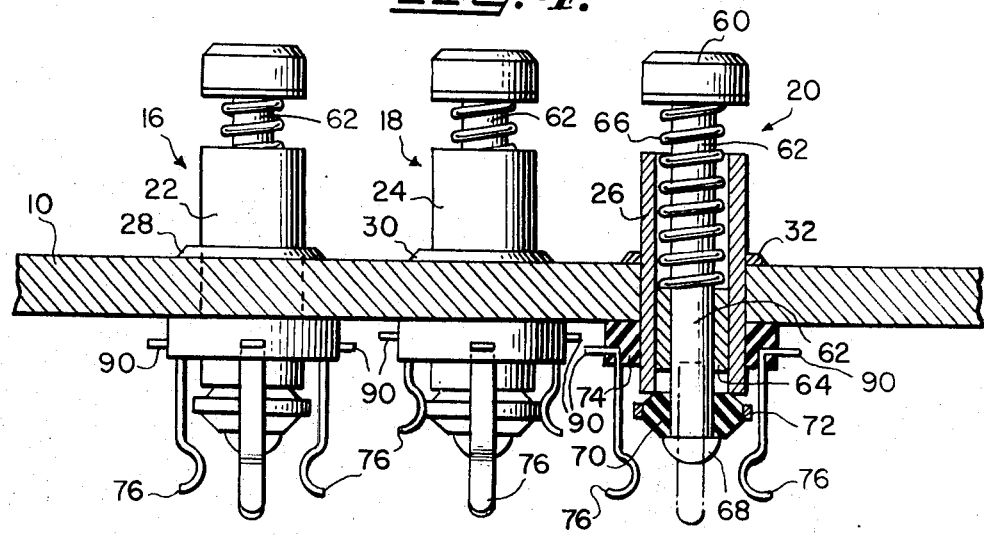
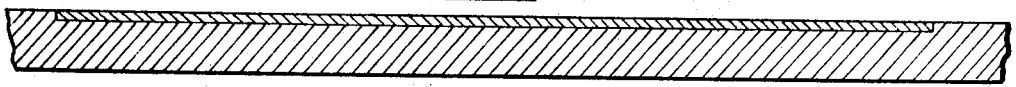
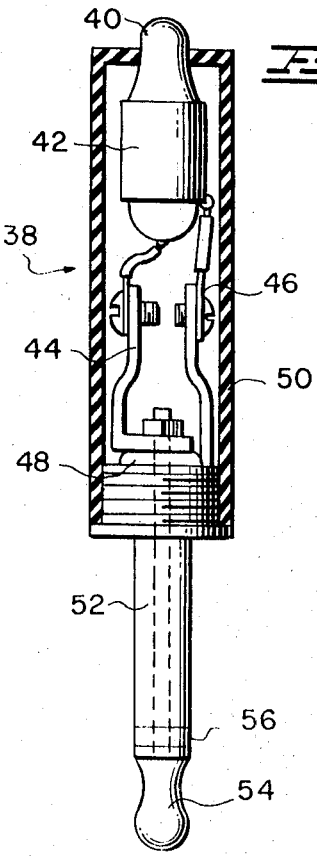
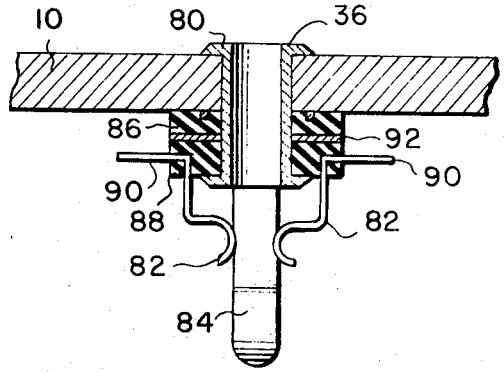
INVENTOR
ALVER W. RUTH

MUSIC TEACHING AID

BACKGROUND OF THE INVENTION

The present invention relates to an educational device and more particularly to a device for teaching a student instrumental chromatic notes and fingerings of horn instruments.

Horn instruments, such as the cornet, trumpet, alto horn, mellophone, baritone, baritone in the treble clef, euphonium and sousaphone in the bass clef, are normally played by manipulating three valve pistons with the pointer, middle and ring fingers of the right hand. Conventional methods of teaching a student to play such instruments requires personal supervision. The learning process is slow and largely depends on the student's ability to recognize the sounds of the various notes played.

SUMMARY OF INVENTION

The present invention is directed to an educational device for teaching a student notes and fingerings of three-valved horn instruments which is self-scoring and self-instructional thereby eliminating the need for the physical presence of an instructor and allowing the student to learn at his own pace. Three pistons or valves, representing the valves on conventional instruments, are positioned on a panel board having a chromatic note chart for one of the above described instruments and provided with electric circuits corresponding to the notes. A movable response indicator, adapted to be electrically connected in the panel board circuits, is energized in response to the depression of the valves to provide a scoring indication of the notes simulated by the student.

Among the objects of the present invention are the provision of a self-scoring, self-instructional teaching device for teaching a student instrumental chromatic notes and fingerings representative of horn instruments; the provision of a note and fingering instrument which may be used by novice students at their own pace without the need of an instructor; the provision of an educational device for testing a student's knowledge of horn instruments which will be interesting and self-instructional while at the same time provide an immediate indication of the result of the student; and the provision of an educational device for teaching the notes and fingerings of horn instruments which does not require the instrument itself.

Other objects and further applicability of the present invention will become more apparent when taken from the detailed description given below in conjunction with the accompanying drawings.

BRIEF DESCRIPTION OF THE DRAWINGS

FIG. 3 is a sectional view taken along lines 3—3 of FIG. 2, looking in the direction of the arrows.

FIG. 4 is an enlarged view, partly in section, of a detail of the structure shown in FIG. 1.

FIG. 5 is an enlarged sectional view of another detail shown in FIG. 1.

FIG. 7 is a section taken on lines 7—7 of FIG. 1, looking in the direction of the arrows.

DESCRIPTION OF THE PREFERRED EMBODIMENT

Figure 1:
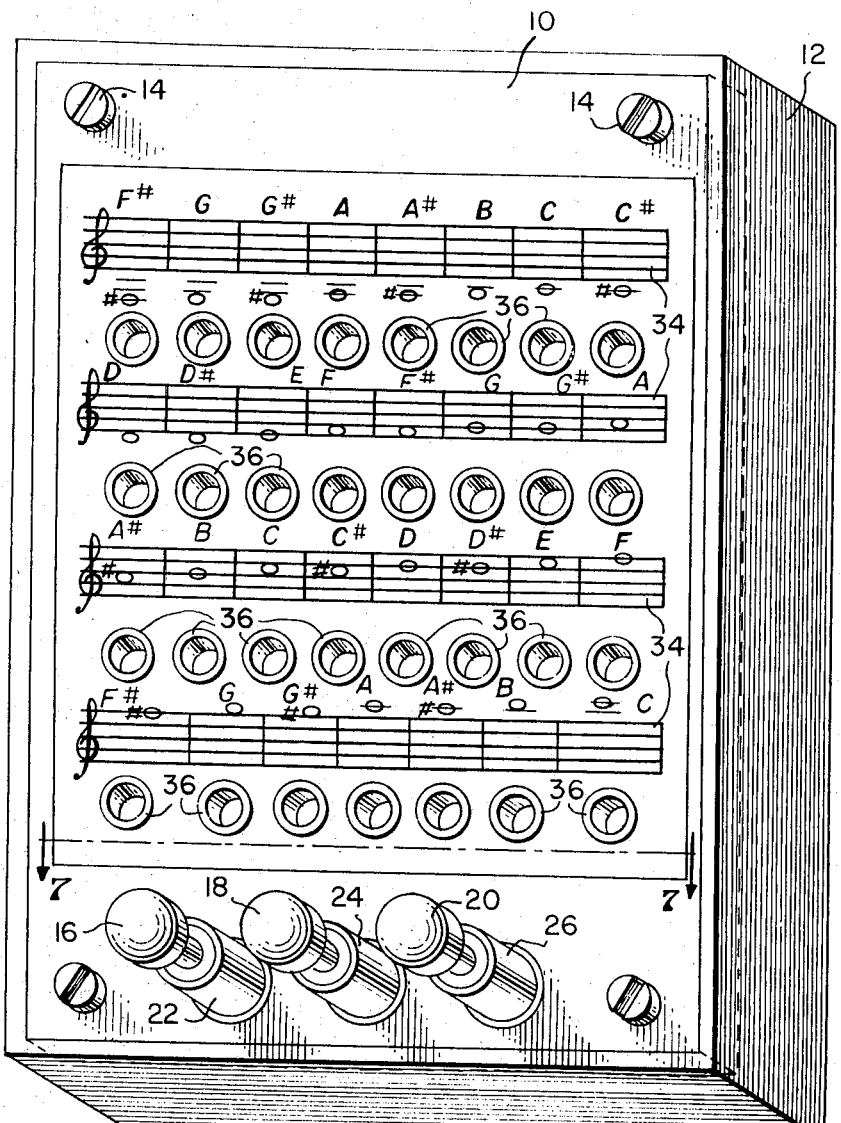
FIG. 1 is a perspective view of the panel board of the present invention.

As illustrated in FIG. 1, the educational device of the present invention is formed of a panelboard 10 secured to a housing 12 by means of screws 14. The lower portion of the panelboard is provided with piston valves 16, 18 and 20 which represent the three conventional piston valves on horn instruments such as the cornet, trumpet, and so forth. The piston valves each, are movably mounted in cylinders 22, 24 and 26 which are secured to the panelboard 10 by retaining rings 28, 30 and 32. The piston valves 16, 18 and 20 are positioned at the lower portion of the panelboard 10 so as to be readily manipulated by using the first, second, and third fingers of the right hand as with conventional instruments. The upper portion of the panelboard 10 is provided with a number of musical scales 34. Sections of these scales 34 are provided with a letter and scale indication of musical notes in ascending order. For example, the first note on the upper scale 34 is lettered F# and a note is shown on the scale in the F# position. Similarly, the last note on the lower scale is lettered high C and shown as such on the scale. The range of notes depicted and used with the present invention is not all-inclusive, however, it does represent the notes ordinarily used.

Figure 2:
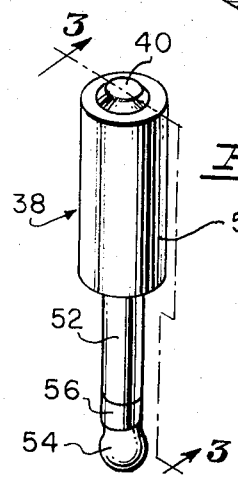
FIG. 2 is a perspective view of an indicator plug adapted to be inserted in the panel board of FIG. 1.

Under each of the notes on the scale, a jack 36 is provided, as described in detail with reference to FIG. 5. Each jack 36 is adapted to receive an indicator 38, shown in detail in FIGS. 2 and 3. The indicator 38 includes a small screw base lamp 40, a lamp socket 42, a pair of contacts 44 and 46 and an insulating washer 48 separating the contacts, mounted in a plastic housing 50. A conductor plug 52 adapted to fit into the jacks 36 forms the lower end of the indicator 38. A ground contact tip 54 is insulated from the conductor plug 52 by a washer 56 and is adapted to contact the ground terminal (not shown) in the center of each socket 36 to complete the circuit through the lamp 40 when the copper plunger valves are depressed, as described in detail below. The plug 52 is electrically connected to contact 46 of the lamp 40 while the ground tip 54 is connected to the lamp through contact 44.

The piston valve arrangement mounted on the lower portion of the panelboard 10 is shown in detail in FIG. 4. Each of the piston valves 16, 18 and 20 include a cap 60 threaded into a plunger shaft 62 having a plunger stem guide 64 which fits into the mounting cylinders. The plunger shaft is biased in an upward direction by means of a spring 66. The lower end of the plunger shaft includes a flared end 68 which carries an insulating ring 70 and an annular contact ring 72 mounted over the insulating ring 70. Each of the plunger valve mounting cylinders, for example, cylinder 26 shown in section, is passed through the panelboard 10 and secured thereto by means of a mounting bushing 74. This bushing on each of the piston valves 16, 18 and 20 mounts electrical contacts 76 which are connected in the electrical circuit of the device. The contacts 76 are spring biased inwardly so as to complete an electrical circuit at that point when the contacts 76 are aligned with the annular contact ring 72 of the piston valves such as shown with respect to piston valve 18. Piston valve 16 is provided with two contacts 76 and a circuit is closed between them when its spring biased plunger shaft 62 is depressed. Piston valve 18 is provided with three contacts 76 and a circuit is completed when its plunger is depressed. Piston valve 20 is provided with four contacts and a circuit is completed when its plunger is depressed.

A detailed sectional view of one of the jacks 36 is shown in FIG. 5. The jack 36 is formed of a metal tube 80 having swaged over ends and is mounted into the panelboard 10. Each jack 36 includes three contacts 82 which contact the conductor plug 52 of the indicator 38 and a ground contact 84 which contacts the ground contact tip of the indicator 38 when it is placed in the socket. The lower end of each jack 36 is mounted on the panelboard 10 by means of two insulating washers 86 and 88 which also support the contacts 82 and the ground contact 84. Each contact 82 is connected to a metallic contact strip 90 which forms a part of the electrical circuit. The ground contact 84 is also connected to a metallic contact strip 92 which also forms part of the electrical circuit ground line. Thus, with the indicator in place within one of the jacks 36, there is electrical continuity between the ground contact 84 of the jack 36, the ground contact tip 54 of the indicator 38, the lamp 40, the conductor plug 52 and the contacts 82.

Figure 6:
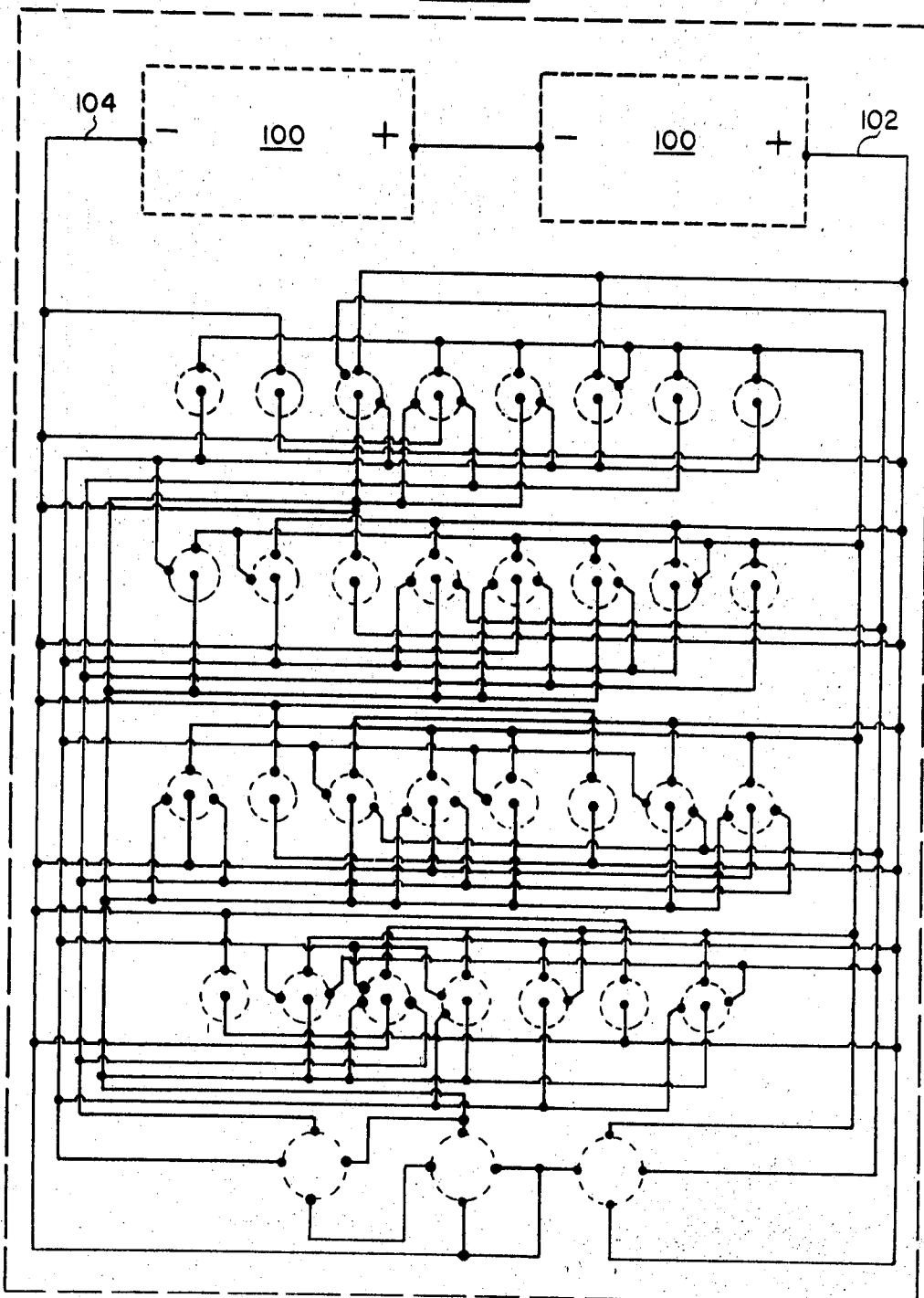
FIG. 6 is a schematic wiring diagram of the electrical circuit of the present invention.

The electrical circuit is shown in FIG. 6. Two suitable dry cell batteries 100 are shown as the power source, although it will be appreciated that any suitable source of low voltage supply may be used. The circuit includes a positive line 102 and a negative line 104. The circuit load is the indicator lamp 40. Switches in the form of the above-described piston valves 16, 18 and 20 and their associated parts are adapted to complete a circuit through the lamp 40 when they are manipulated in accordance with the corresponding location of the indicator 38 in a jack 36. The physical layout of the circuit may be characterized as a number of series-parallel loops which are known to those of ordinary skill in the art. For this reason, a detailed description of the circuit is not deemed necessary except from a functional standpoint as described below.

The operation of the device is described as follows. With the indicator 38 placed in the corresponding socket and proceeding chromatically from the lowest on the first staff to the highest note on the fourth staff on the treble clef, the following is a description of each finger pattern necessary in order to activate the response indicator with the correct answer.

The note F# requires all of the plungers 16, 18 and 20 to be fully depressed in order for the response indicator to light up;

The note G requires the first plunger 16 and third plunger 20 to be fully depressed in order for the response indicator to light up;

The note G# requires the second plunger 18 and third plunger 20 to be fully depressed in order for the response indicator to light up;

The note A requires the first plunger 16 and second plunger 18 to be fully depressed in order for the response indicator to light up;

The note A# requires the first plunger 16 to be fully depressed in order for the response indicator to light up;

The note B requires the second plunger 18 to be fully depressed in order for the response indicator to light up;

The note C requires no plungers and the response indicator will automatically light up when the plug is inserted;

The note C# requires all the plungers 16, 18 and 20 to be fully depressed in order for the response indicator to light up;

The note D requires the first plunger 16 and third plunger 20 to be fully depressed in order for the response indicator to light up;

The note D# requires the second plunger 18 and third plunger 20 to be fully depressed in order for the response indicator to light up;

The note E requires the first plunger 16 and the second plunger 18 to be fully depressed in order for the response indicator to light up;

The note F requires the first plunger 16 to be fully depressed in order for the response indicator to light up;

The note F# requires the second plunger 18 to be fully depressed in order for the response indicator to light up;

The note G requires no plungers and the response indicator will automatically light up when the plug is inserted;

The note G# requires that the second plunger 18 and the third plunger 20 be fully depressed in order for the response indicator to light up;

The note A requires that the first plunger 16 and the second plunger 18 be fully depressed in order for the response indicator to light up;

The note A# requires that the first plunger 16 be fully depressed in order for the response indicator to light up;

The note B requires that the second plunger 18 be fully depressed in order for the response indicator to light up;

The note C requires no plungers and the response indicator will automatically light up when the plug is inserted;

The note C# requires that the first plunger 16 and second plunger 18 be fully depressed in order for the response indicator to light up;

The note D requires that the first plunger 16 be fully depressed in order for the response indicator to light up;

The note D# requires the second plunger 18 to be fully depressed in order for the response indicator to light up;

The note E requires no plungers and the response indicator will automatically light up when the plug is inserted;

The note F# requires that the first plunger 16 be fully depressed in order for the response indicator to light up;

The note G requires no plungers and the response indicator will automatically light up when the plug is inserted;

The note G# requires second plunger 18 and third plunger 20 to be fully depressed in order for the response indicator to light up;

The note A requires the first plunger 16 and second plunger 18 to be fully depressed in order for the response indicator to light up;

The note A# requires the second plunger 18 and third plunger 20 to be fully depressed in order for the response indicator to light up;

The note B requires the second plunger to be fully depressed in order for the response indicator to light up;

The note C requires no plunger and the response indicator will automatically light up when the plug is inserted.

This sequence of chromatic notes and finger patterns completes the entire range of notes and finger patterns for treble clef instruments. There are notes and finger patterns that go beyond the highest listed here, however, it is the intent of this invention to present only notes and finger patterns which have a practical use and are ordinarily in use.

It will be appreciated that the above-described invention is not limited but may be useful for similar musical instruments where a fingering operation is required to change notes.

What is claimed is:

1. An educational device for teaching chromatic notes and fingerings of a valved instrument comprising a panel, a plurality of indicia on said panel representing musical notes, depressible switching means on said panel adapted to be depressed by the fingers according to valve positions of a known instrument, an electric circuit including a contact jack for each of said notes and a connector plug adapted to fit into one of said jacks, said connector plug having an indicator mounted thereon to provide a signal in response to the depression by the fingers of said depressible switching means.

2. The device of claim 1 wherein said switching means is arranged with said contact jacks so as to require a specific switching arrangement to actuate said indicator, said switching arrangement depending upon the location of said connector plug of said indicator in one of said jacks.

3. The device of claim 1 wherein said indicator includes a lamp and a ground pin in series with said connector plug and said jack comprises a first contact member adapted to engage said connector plug and a second contact member insulated from said first contact member whereby placing of said indicator in said jack provides electrical continuity in said circuit at that point.

4. The device of claim 1 wherein said means includes a mounting cylinder, a spring biased piston movable with said cylinder, said movable piston including an electrical contact member, and a fixed contact member, said movable contact member being adapted to be brought into or out of electrical continuity with said fixed contact member by movement of said spring biased piston and response to actuation by the fingers.

* * * * *